May 30, 1950
P. W. JONES ET AL
2,509,354
PRESSING MACHINE
Filed Nov. 29, 1946
3 Sheets-Sheet 1
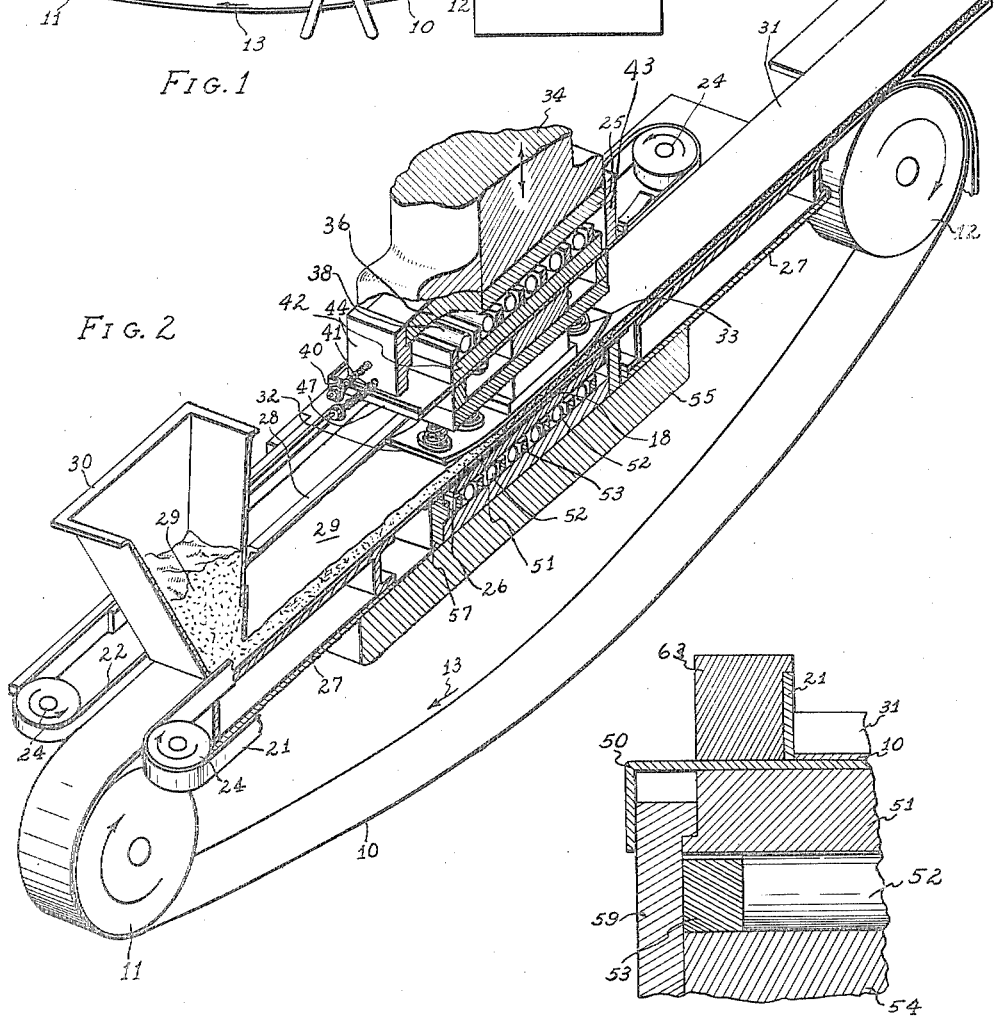
INVENTOR.
PAUL W. JONES &
MAURICE G. KNOY
BY Benedict & Swartwood
ATTORNEYS

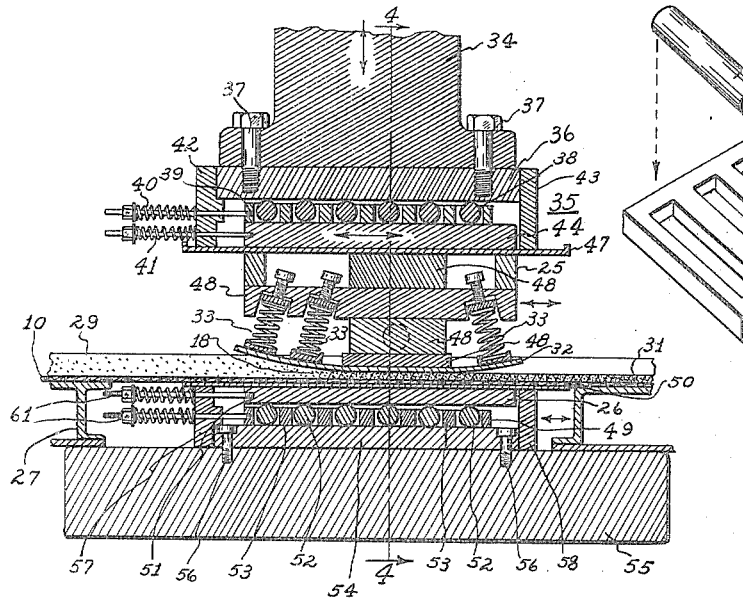
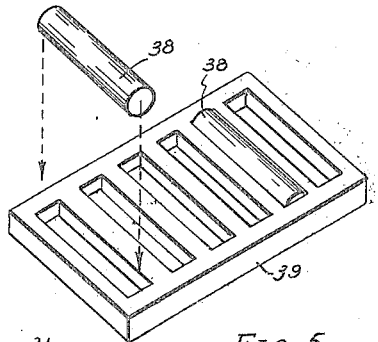
FIG. 5
FIG. 3
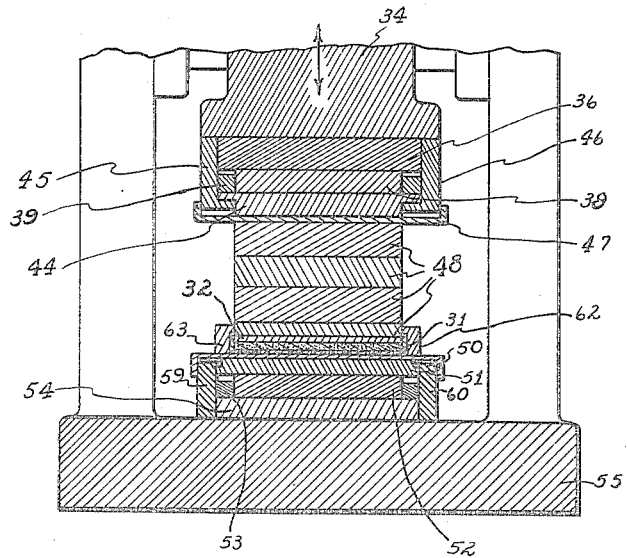
FIG. 4
INVENTOR.
PAUL W. JONES &
BY MAURICE G. KNOY
Benedict & Swartwood
ATTORNEYS May 30, 1950  P. W. JONES ET AL  2,509,354
PRESSING MACHINE
Filed Nov. 29, 1946  3 Sheets-Sheet 3

INVENTOR.
PAUL W. JONES &
MAURICE G. KNOY
BY Benedict & Swartwood
ATTORNEYS

Patented May 30, 1950

2,509,354

UNITED STATES PATENT OFFICE 2,509,354

PRESSING MACHINE

Paul W. Jones and Maurice G. Knoy, La Fayette, Ind., assignors to Rostone Corporation, La Fayette, Ind., a corporation of Indiana Application November 29, 1946, Serial No. 713,022

13 Claims. (Cl. 18—5)

This invention relates to an improved continuous pressing machine for pressing or molding plastic or semi-plastic materials.

Our invention is particularly concerned with a pressing machine in which the material to be pressed is continuously moved and the pressing station of the machine moves with the material in order that a continuous operation is obtained.

It is one of the principal objects of our invention to provide bearing means for permitting the pressing station of the machine to move with the moving material being pressed.

Previous to our invention various means had been employed for permitting the pressing station of the machine to move with the work or material being pressed but none of them had been found satisfactory for small machines demanding relatively high pressures. Hydraulic pressure has been used to relieve the pressure of the pressure head of such machine on the table support, but such hydraulic systems require a delicate balancing of pressures and in many cases require expensive equipment to obtain such delicate balancing of pressures. By our device such expensive equipment is eliminated and a cheap, economical, small machine is made available. It is therefore an object of our invention to provide bearing means in a pressing machine using high forming pressures in which the forming pressure is limited only by the strength and practicability of the mechanical design, without resorting to hydraulics and other systems.

It is also an object of our invention to provide improved means for preventing both lateral and longitudinal displacement of the material being pressed during the pressing operation.

It is a further object of the invention to provide a plurality of continuous conveyor belts arranged both horizontally and longitudinally for preventing displacement of the material during pressing and for feeding the material to and through the pressing station.

Our machine can be used to either press powder into a solid sheet material or can be used in connection with molds and particular designs.

Other advantages, objects and uses of our invention will become apparent by referring to the drawings which illustrate one practicable machine embodying our invention. Our machine is described in connection with the pressing of powder, although it is to be understood that the machine is applicable to pressing a wide variety of plastic and semi-plastic materials.

Figure 1 illustrates a diagrammatic layout of the type of pressing operation in which our invention is used.

Figure 2 is a perspective view of the machine particularly illustrating the means for conveying the powder to the pressing station. Also, Figure 2 is a view partly in cross section, illustrating the pressure head and bed plate, showing particularly the bearing means for allowing longitudinal movement of the pressure head and the bearing plate with the powder during pressing.

Figure 3 is a side elevation in cross section particularly illustrating the pressure head and bed plate together with the bearing means for allowing longitudinal movement of the pressure head and bed plate.

Figure 4 is a cross section taken along the lines 4—4 of Figure 3.

Figure 5 shows the ladder bearing assembly which is illustrated in place in Figure 3.

Figure 8 is a detail of the means for holding the bearing means for the bed plate in place during the pressing operation.

Figure 6:
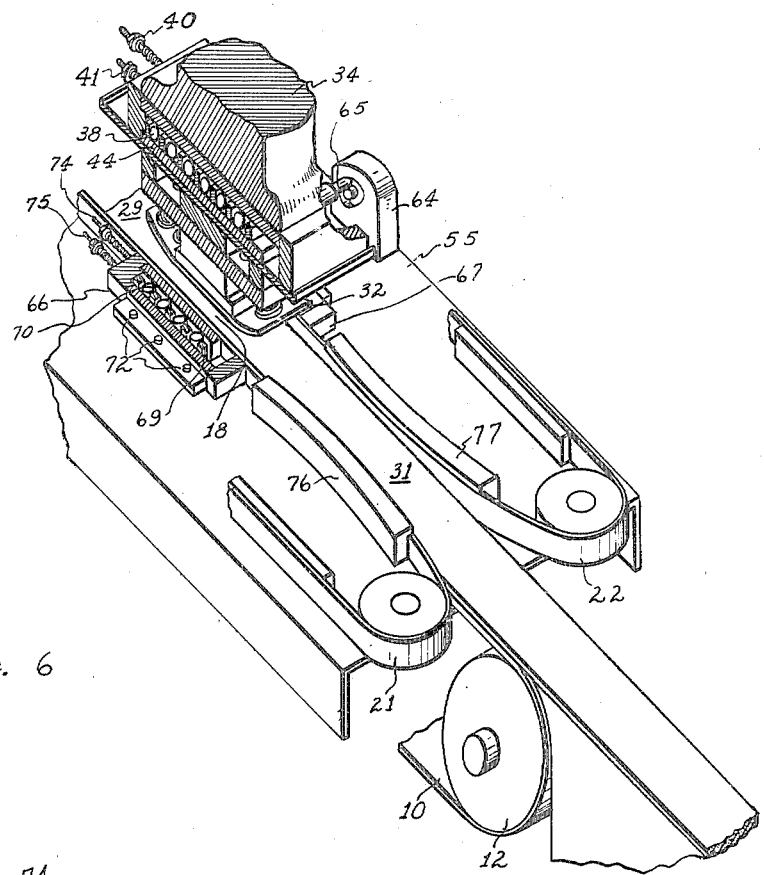
Figure 6 is a perspective view partially in cross section, from the end opposite to the end illustrated in Figure 2, showing in more detail the arrangement of the side conveyor belts and the side supporting means for preventing lateral displacement of the material during pressing.

Referring particularly to Figure 1, an endless belt 10 is provided passing around the two drums 11 and 12. The belt 10 moves in the direction of the arrow 13. A suitable source of power can be supplied to one of the drums, for example, drum 12, which will move the belt 10 in the direction of the arrow 13. The pressure head and the bed plate which are shown in detail in Figures 3 and 4 are designated generally by the numeral 14 in Figure 1. Figure 1 illustrates a pressing operation in which a veneer is to be pressed on the outside of another material, and for that purpose a veneer hopper 14 is provided which feeds the veneer powder onto the continuous belt 10. A suitable strike off mechanism 15 is provided to level and smooth off the powder prior to final feeding. A main feed hopper 16 is provided as well as another strike off mechanism 17. The material is passed by means of the conveyor belt 10 to the pressing station generally designated as 18. Suitable shearing means 19 for cutting the pressed slab 31 into sections are provided. Also a suitable run out table 20 is provided for the cut slabs 31.

Also shown in Figure 1 is prepressing roll 17' which packs and partially presses the powder at low pressures into the form of a cake. The prepressing roll 17' is highly desirable and frequently necessary in pressing some materials.

Figure 1 merely illustrates diagrammatically a machine with which our invention is concerned and is described primarily in order to properly orient the particular device of our invention.

Figure 2 shows a perspective view of a longitudinal cross section of the machine 18 illustrating the more fundamental parts. Referring particularly to Figure 2, the endless belt 10 is driven in the direction of the arrow 13 by means of the power driven drum 12. Drum 11 thereby serves as an idler drum. A pair of endless side belts 21 and 22 are provided which pass over the horizontally disposed drums 24. Suitable power means can be connected to the drums 24 to drive the side belts in the direction of the arrows shown. The side belts 21 and 22 serve a dual function. They assist the movement of the powdered material to be pressed toward the pressing station 18 and prevent lateral displacement of the material being pressed at the pressing station 18 and will be more fully described hereinafter.

A longitudinally moving pressure head, generally designated by the numeral 25, is provided which cooperates with a longitudinally moving bed plate, generally designated by the numeral 26, in pressing the material 29 at the pressing station 18. The belt 10 is supported by the channel table and frame 27 and the bracing strips 28. Powdered material 29 is fed from the hopper 30 onto the continuous conveyor belt 10 and the belt 10, together with the side belts 21 and 22, conveys the material to be pressed beneath suitable strike off and prepressing means not shown in the view but shown in Figure 1, to the pressing station 18 and in turn conveys the pressed material 31 to a suitable table 20 as shown in Figure 1. The particular strike off means for leveling out the powdered material is not shown in Figure 2. It is illustrated diagrammatically in Figure 1 by the numeral 17. Such strike off means, such as the horizontally agitated type, are well known in this art and form no part of our invention.

Pressure applying shoe 32 is attached by the spring and block asemblies 33 to the pressure head 25. The pressure head 25 is attached by means hereinafter described to vertically reciprocating pressure piston 34, and the piston 34 is reciprocated by any source of power application such as a hydraulic press or any suitable mechanical press such as a crank, toggle, screw, knuckle or other type of mechanical press. The particular press which is attached to the reciprocating pressuring piston 34 forms no part of our invention and any suitable reciprocating press can be used.

The material 29 is moved to the pressure station as hereinbefore described and pressed between the shoe 32 and the belt 10 supported by longitudinally moving bed plate 26. The shoe 32, and other parts attached rigidly thereto above, and the bed plate 26 move with the work 29 while it is being compressed. In other words, the pressing station 18 moves with the work during the pressing operation. The details of the construction of the longitudinally moving pressure head 25 which cooperates with the longitudinally moving bed plate 26 are more readily understood by referring to Figures 3 and 4. The bearing assembly is generally designated as 35.

Plate 36 of the bearing assembly 35 is rigidly attached to the piston head 34 by means of bolts 37. the piston 34 is capable of vertical reciprocation only, and, as heretofore pointed out, its power is supplied by mechanical or hydraulic means, and suitable guide assembly is provided according to the style of press used. Immediately below the plate 36 bearing rolls 38 are provided in the retainer ladder assembly 39 as illustrated in detail in Figure 5. The longitudinal bearing rollers 38 allow the longitudinally moving pressure head 25 to move with the work during the pressing operation. In both Figures 2 and 3 the pressure head 25 is in pressing position, i. e., the piston 34 is at the end of its downward stroke and moving pressure head 25, as well as bed plate 26, are at the right end limit of their horizontal travel. Upon the piston 34 being moved vertically upward, as is done between pressing operations, the spring and bolt assembly 40 and 41 provides a means for returning the longitudinally moving pressure head 25 back to its original position in between pressing operations. The springs 40 and 41 compress during the pressing operation when the friction created between the pressure head 25 and the work 29 pulls the head 25 with the work. The longitudinal movement of the pressure head 25 and the bearing ladder assembly 39 is limited by the end plates 42 and 43. Plate 44 supports the ladder assembly 39 and is rigidly attached to the longitudinally moving pressure head 25. The plate 44 is supported against falling by the ledges on side plates 45 and 46 as particularly shown in Figure 4. Below plate 44 and attached thereto is the dust and grease shield 47. The shield 47 maintains sliding contact with the members 42, 43, 45 and 46. The shoe 32 is rigidly attached to the plate 44 by means of the blocking members 48. As previously described, the shoe 32 makes contact with the material to be pressed and bears projections which are suitably adjustable as to shape by means of spring assemblies 33.

Below the material being pressed 29 and the already compacted material 31 and below the continuous belt 10 is a similar bearing assembly to that described in connection with the longitudinally moving pressure head 25. This assembly is generally designated 49 and is the assembly which makes it possible for the bed plate 26 to move with the work. Assembly 49 comprises the dust shield 50, moving plate 51, longitudinal bearing rollers 52, which are arranged in the ladder assembly 53 similar to the ladder assembly 39 of Figure 5 which is used in the longitudinally moving pressure head 25. Base plate 54 on which the bearings 52 roll is rigidly attached to the main press base 55 by means of the bolts 56. End plates 57 and 58 limit the longitudinal movement of the bearing assembly 49. The assembly is held in place by the side plates 59 and 60 (see Figure 4) which are rigidly attached to the main press base 55. The main press base 55 is supported by legs or any suitable means as provided by the types of press used. Bolt and spring assembly 61 returns the longitudinally moving bed plate assembly 26 to its original starting position in between pressing operations.

Material to be pressed 29 is pulled at a constant speed to and through pressing station 18 on belt 10 and retained by the side belts 21 and 22. The side guides 62 and 63 also assist the side belts 21 and 22 in retaining the material being pressed within the pressing zone and for preventing lateral displacement of the material during pressing. Thus we have described a machine in which the reciprocable moving piston 34 applies pressure on the moving strip of material 29 pressing the material into the compact form as illustrated by the numeral 31.

When contact with the material 29 is made by the shoe 32 on the down stroke of the piston 34, the friction of contact pulls the shoe 32 and the moving pressure head 25, including the sliding plate 44, along with the material 29 while the same is being pressed down to compacted material 31. When the piston 34 moves upward on its upstroke, the contact between material 31 and shoe 32 is broken and shoe 32, together with the assembly above, is forced to return to its initial starting position against the stop 42 by the action of the spring and bolt assemblies 40 and 41. The assembly 40 returns the roller bearings 38 and spring assembly 41 returns the slidable plate 44. Likewise, at the same time spring and bolt assemblies 61 return the roller bearings 52 and the slidable plate 51 which are part of the movable bed plate assembly 26.

Beneath traveling belt 10, when pressure from the down stroke to the piston 34 causes sufficient friction between the slidable plate 51 and the belt 10, dust guard 50 and plate 51 move with the belt 10 rolling on rollers 52 until the pressure from above ceases with the upward stroke of the piston 34. At this time, plate 51 together with dust guard 50 are returned to their starting position against the stop 57 by the spring assemblies 61.

The above represents a cycle in the operation of the device with new material 29 being moved into the pressing zone 18 by traveling belt 10 between each vertical stroke of the piston head 34. The rollers 38 permit the longitudinally moving pressure head 25 to move with the work during pressing, and rollers 52 permit the longitudinally moving base plate 51 to move with the work during pressing, and the spring assemblies 40, 41 and 61 return the longitudinally moving pressure head and bed plate to their initial starting positions in between pressing operations. Thus, by a suitable bearing device we have eliminated all complicated and delicately balanced hydraulic systems for permitting such longitudinal movement of the pressing means during the pressing operation. The amount of pressure exerted by the pressure head through the shoe 32 is only limited by the strength of the rollers and plates and such can be designed to sustain tremendous pressures.

The above description shows friction means for moving the movable pressure head and bed plate during the pressing operation. However, for pressing some materials such as light, fluffy materials, it may be required to have a positive means for moving the longitudinally moving pressure head 25. Such positive means is particularly shown in Figure 6. A bracket 64 is rigidly attached to the bed plate support 55. The bracket 64 has in its inner face a machined socket or cam track which guides the pin 65 during the downward movement of the piston 34. The pin 65 is rigidly attached to the blocking members 48. Thus the power of the downward stroke of the piston 34 forces the shoe 32 and related parts attached thereto to follow the work during the pressing operation and thereby prevents slippage between the work and the shoe 32. It is also within the scope of this invention to have a similar means for positively moving the movable bed plate 26 and the side plate 68. Other independent sources of power to perform these tasks may be employed if desired.

Figure 7:
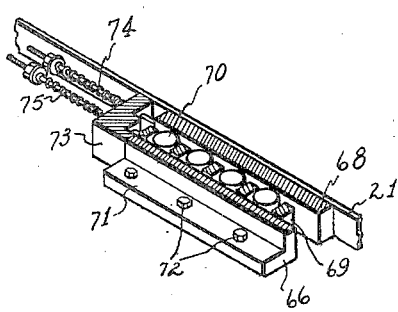
Figure 7 is a detailed view of the side support illustrated in place in Figure 6 showing the bearing means used.

In some cases, especially where thick products are to be formed and high pressure must be used, means must be provided to prevent lateral displacement of the work during the pressing operation. For this purpose a pair of bearing assemblies 66 and 67 are provided on opposite sides of the work being pressed, which cooperate with the movable pressure head 25 and movable bed plate 26 during the pressing operation. The bearing assemblies 66 and 67 take the place of the side supports 62 and 63 shown in Figure 4. The two assemblies 66 and 67 are identical and assembly 66 is shown in detail in Figure 7; except that in Figure 7 the side plate 68 has been moved during the pressing operation to the limit of its longitudinal movement. In both Figures 6 and 7 the assembly 66 is shown in horizontal perspective cross section. Suitable dust and grease protection shields are provided in a similar manner as for the ladder assemblies 39 and 53 for the movable pressure head 25 and the movable bed plate 26 respectively. A movable side plate 68 is provided immediately adjacent the side belt 21. A relatively small ladder assembly 69 is vertically disposed next to the moving plate 68 and contains the vertically disposed roller bearings 70. A side supporting means 71 for the movable plate 68 and bearing assembly 69 is provided and it is rigidly attached to the bed plate support 55 by means of the bolts 72. Suitable stops 73 are provided to limit the longitudinal movement of the plate 68 and the ladder bearing assembly 69. Spring assembly 74 returns the plate 68 in between pressing operations, and the spring assembly 75 returns the ladder assembly 69 in between pressing operations. Thus we have provided movable side plates which move with the work during the pressing operation and which provide additional support for the side belts 21 and 22 and prevent lateral displacement of the work 29 during the pressing operation.

Figure 8 is a detailed sketch showing the notch in the side support 63 which prevents the belt 21 from lifting and shows a notch in the support 59 for preventing the entire assembly of the moving bed plate from lifting. Figure 8 is a detailed section of a portion of Figure 4.

Some materials during pressing may tend to be pushed ahead on the belt 10 during the pressing operation and means must be provided to limit this tendency and to provide a means for preventing to some extent a longitudinal displacement of the work 29 during the pressing operation. The inverted L-shaped members 76 and 77 shown in Figure 6 serve this purpose. These members are positioned immediately adjacent following the pressing of the work in the pressing stage 18. The members 76 and 77 provide additional side supports for the belts 21 and 22 and are shaped so as to converge the side belt, thereby offering resistance to the pressed material 31 and preventing longitudinal displacement of the work during the pressing operation. They are also shaped diverging following said converging so that the pressed material 31 is relieved and will readily break away from the side belts 21 and 22. Other means such as a spring weighted roll or plate, contacting the pressed material 31 immediately after the pressing may be used to serve this purpose.

Although not illustrated, a means can be provided to pull heavy materials through the machine by introducing small indentations or holes in the driving belt 10 to engage with matching contours in the driving pulley 12; or the inside of the driving belt can be coated with a friction material such as a thin film of rubber to prevent slippage of the belt 10 on the drum 12. A chain driven series of molds, and/or, pallets might also be employed.

If it is desired to impose designs on a surface of the material being pressed, the pressing surface of the belt 10 can be so designed to impart the design thereon. Veneered products are obtainable by two feeding stations as shown in Figure 1. It is also within the scope of this invention to change the shape of the shoe 32 to suit the requirements of the material being compressed.

By the above construction we are able to press plastic or semi-plastic material by moving the same in a continuous manner at a substantially constant speed while applying pressure at a pressure station on the work. The pressing station shifts with the work while the pressure is being applied and is retracted to normal position when the pressure is relieved thereby effecting a compression of the work by successive increments.

We claim as our invention:

1. In a pressing machine of the character described a vertical reciprocable pressure means; a longitudinally moving pressure head slidably attached to said pressure means; bearing means disposed between said pressure means and said pressure head comprising elongated metal rollers adapted to roll with the longitudinal movement of said pressure head; a longitudinally moving bed plate; a support for said bed plate; continuous moving means for moving said material to be pressed between said pressure head and said bed plate in the direction of the longitudinal movement of said pressure head and bed plate; and positive means for moving said pressure head and bed plate in a direction opposite to the direction of movement of the material in the interval between pressing operations.

2. In a pressing machine of the character described, a vertical reciprocable pressure means; a reciprocally mounted longitudinal pressure head slidably attached to said pressure means; a pressing shoe attached thereto, roller bearings disposed between said pressure means and said pressure head; a longitudinally movable bed plate; a support for said bed plate; a conveyor for continuously moving the material to be pressed between said pressure head and said bed plate in the direction of the longitudinal movement of said pressure head; said pressure head adapted to move on said bearing by the friction created between the material and said pressure head, in the direction of travel of the material during the pressing operation, and mechanism to return the pressure head and bed plate to starting position in the interval between pressing operations.

3. The apparatus of claim 2 further defined in that said bearing means comprises elongated metal rollers alternately spaced apart in ladder arrangement by spacers; said rollers adapted to roll between said spacers with the longitudinal movement of said pressure head during the pressing operation.

4. The apparatus of claim 1 further defined in that said positive means comprises means defining a cam track, said means being fixed; a cam follower attached to said pressure head; said cam follower adapted and arranged in said cam track to cause movement of said pressure head in the direction of travel of said material during the pressing operation.

5. In a pressing machine of the character described a vertical reciprocable pressure means; a longitudinally moving pressure head slidably attached to said pressure means; roller bearing means between the pressure means and the pressure head; a longitudinally moving bed plate; a support for said bed plate; said bed plate slidably attached to said support; bearing means between said bed plate and said support; said bearing means comprising elongated metal rollers disposed laterally and adapted to roll with the longitudinal movement of said bed plate; and positive means for moving said pressure head and said bed plate in a direction opposite to the direction of movement of the material in the interval between pressing operations.

6. In a pressing machine of the character described a vertical reciprocable pressure means; a longitudinally moving pressure head slidably attached to said pressure means; bearing means disposed between said pressure means and said pressure head comprising elongated metal rollers laterally disposed and adapted to roll with the longitudinal movement of said pressure head; a longitudinal movable bed plate; a support for said bed plate; said bed plate slidably attached to said support; and bearing means disposed between said bed plate and said support and said bed plate comprising elongated metal rollers laterally disposed and adapted to roll with the longitudinal movement of said bed plate.

7. In a pressing machine of the character described a vertical reciprocable pressure means; a longitudinally moving pressure head slidably attached to said pressure means; bearing means disposed between said pressure means and said pressure head comprising elongated metal rollers laterally disposed and adapted to roll with the longitudinal movement of said pressure head; a longitudinal movable bed plate, a support for said bed plate; said bed plate slidably attached to said support; bearing means disposed between said bed plate and said support, said bed plate comprising elongated metal rollers laterally disposed and adapted to roll with the longitudinal movement of said bed plate; and positive means for moving said pressure head and said bed plate in a direction opposite to the direction of the movement of the material in the interval between pressing operations.

8. In a pressing machine of the character described a vertical reciprocable pressure means; a pressure head slidably attached to said pressure means; bearing means disposed between said pressure head and said pressure means for allowing longitudinal movement of said pressure head; a base support; a bed plate slidably attached to said base support; bearing means disposed between said base support and said bed plate for allowing longitudinal movement of said bed plate; means for continuously moving material to be pressed over said bed plate and under said pressure head; a longitudinally moving side support adjacent and coincident with each side of said pressure head and said bed plate for lateral confinement of said material during pressing of said material between said pressure head and said bed plate; a support means for said longitudinal support; said longitudinal support being slidably attached to said support means;

bearing means disposed between said last mentioned support means and said longitudinal support; and all of said bearing means comprising elongated metal rollers alternately spaced apart in ladder arrangement by spacers, said rollers adapted to roll between said spacers with the longitudinal movement of said pressure head, said bed plate and said longitudinal support during the pressing operation.

9. In a pressing machine of the character described a longitudinally moving bed plate; a support for said bed plate; a reciprocable and longitudinal movable pressure head cooperating with said bed plate to compress said material; means for moving said material to be pressed between said pressure head and said bed plate, said pressure head and bed plate being moved by the material in the direction of travel of the material during the pressing operation; means for moving the pressure head and bed plate in a direction opposite to the direction of movement of the material in the interval between pressing operations; a pair of continuously moving conveyor belts vertically disposed on each side of and cooperating with said pressure head and said bed plate so as to confine laterally the material being pressed between said bed plate and said pressure head and to assist in the movement of said material to pressing position between said bed plate and said pressure head; a pair of inverted L-shaped guide supports attached to said bed plate support and positioned immediately following the pressing of said material by said head and bed plate; said L-shaped guides extending oved said continuous side belts thereby preventing said side belts from being lifted vertically during the upward movement of said reciprocable pressing head; and said L-shaped side supports first converging toward each other to prevent longitudinal displacement of the material during the pressing operation and then diverging away from each other so as to cause said pressed material to break away from said side continuous belts.

10. The apparatus of claim 1 wherein the last mentioned means comprises a cam.

11. The apparatus of claim 1 having a vertical side support adjacent each side of said pressure head and said bed plate for confining said material during pressing.

12. The apparatus of claim 1 having a movable vertical side support adjacent each side of said pressure head and said bed plate for confining said material during pressing, the forward movement of said side supports being synchronous with the forward movement of the head and the bed.

13. The apparatus of claim 1 having a vertical side support adjacent each side of said pressure head and said bed plate for confining said material during pressing, said side supports comprising vertical continuously moving belts.

PAUL W. JONES.
MAURICE G. KNOY.

REFERENCES CITED

The following references are of record in the file of this patent:

UNITED STATES PATENTS

| Number | Name | Date |
| --- | --- | --- |
| 1,461,940 | Schenk | July 17, 1923 |
| 1,538,425 | Debay | May 19, 1925 |
| 2,046,047 | Watkins | June 30, 1936 |
| 2,051,011 | Smith | Aug. 11, 1936 |
| 2,194,593 | Graham | Mar. 26, 1940 |
| 2,195,683 | Ross et al. | Apr. 2, 1940 |
| 2,271,599 | Maurer | Feb. 3, 1942 |
| 2,297,504 | Salvaneschi | Sept. 29, 1942 |